United States Patent [19]

Emoto et al.

[11] Patent Number: 4,684,799
[45] Date of Patent: Aug. 4, 1987

[54] FOCUS DETECTION METHOD INVOLVING CUTTING MORE THAN HALF OF LIGHT BEAM REFLECTED FROM DISC

[75] Inventors: Masami Emoto; Hideo Inuzuka, both of Yokohama, Japan

[73] Assignee: Ricoh Company, Ltd., Tokyo, Japan

[21] Appl. No.: 880,373

[22] Filed: Jun. 30, 1986

Related U.S. Application Data

[63] Continuation-in-part of Ser. No. 533,723, Sep. 19, 1983, abandoned.

[51] Int. Cl.⁴ .............................................. G01J 1/20
[52] U.S. Cl. ...................................... 250/201; 369/45
[58] Field of Search ..................... 250/201 DF, 204; 369/44, 45, 46

[56] References Cited

U.S. PATENT DOCUMENTS

| | | | |
|---|---|---|---|
| 3,969,576 | 7/1976 | Boonstra et al. | 250/201 |
| 4,349,901 | 9/1982 | Howe | 369/46 |
| 4,441,175 | 4/1984 | Shuman | 369/45 |
| 4,445,209 | 4/1984 | Mickelson et al. | 369/45 |
| 4,450,547 | 5/1984 | Nakamura et al. | 250/204 |

*Primary Examiner*—David C. Nelms
*Assistant Examiner*—William L. Oen
*Attorney, Agent, or Firm*—David G. Alexander

[57] ABSTRACT

A knife edge type focus detection method for optics associated with an optical pickup is disclosed. A light intercepting member is interposed between an object lens and a light receiving element for focus detection in order to cut 60–95% of a reflected flux for focus detection before the flux reaches the light receiving element. The intercepted part of the flux includes a light ray which propagates through the optical axis of the optics.

9 Claims, 10 Drawing Figures

FOCUS DETECTION METHOD INVOLVING CUTTING MORE THAN HALF OF LIGHT BEAM REFLECTED FROM DISC

CROSS REFERENCE TO RELATED APPLICATION

This application is a continuation-in-part of copending U.S. patent application Ser. No. 533,723, filed Sept. 19, 1983, now abandoned.

BACKGROUND OF THE INVENTION

The present invention relates to a method of detecting a focus in optics associated with an optical pickup.

Optics of the kind described is known as a device for converging light from a laser to a circular information recording medium via an object lens to thereby read information out of the medium or write information thereinto. In such an optical system, the laser beam, whether reading or writing information, has to be properly focused by the object lens to the recording medium.

The above situation requires a method of determining whether a laser beam has been focused by the object lens to the recording medium. Typical of focus detection methods heretofore proposed is the knife edge type method. However, the prior art knife edge type detection method is not always satisfactory due to limited sensitivity of detection achievable therewith.

SUMMARY OF THE INVENTION

It is therefore an object of the present invention to provide a focus detection method which attains an excellent detection sensitivity by eliminating the drawback inherent in the prior art knife edge type detection method.

It is another object of the present invention to provide a generally improved focus detection method.

A method of detecting a focus of optics associated with an optical pickup of the present invention comprises the steps of turning light issuing from a laser into a parallel flux, splitting the parallel flux by means of a polarizing beam splitter, converting the flux split by polarization to an information recording medium through a ¼ wavelength plate and an object lens, transmitting light reflected by the recording medium through the object lens and the ¼ wavelength plate along an optical axis so as to form a parallel flux, converging the parallel reflected flux by a converging lens, cutting 60–95% of the converged reflected flux by means of a light intercepting plate which intercepts a central part of the converged reflected flux surrounding the optical axis and passes at least a peripheral part of a minor segment of a circular cross-sectional area of the converged reflected flux, causing the passed part of the reflected flux to converge to a light receiving element to form a light receiving surface in a spot having a predetermined area, and dividing the area of the light receiving spot into at least two sections and performing a control such that the adjacent sections of the light receiving spot receive a same quantity of light.

In accordance with the present invention, a knife edge type focus detection method for optics associated with an optical pickup is disclosed. A light intercepting member is interposed between an object lens and a light receiving element for focus detection in order to cut 60–95% of a reflected flux for focus detection before the flux reaches the light receiving element. The intercepted part of the flux includes a light ray which propagates through the optical axis of the optics.

The above and other objects, features and advantages of the present invention will become apparent from the following detailed description taken with the accompanying drawings.

DESCRIPTION OF THE PREFERRED EMBODIMENT

While the focus detection method for optics associated with an optical pickup of the present invention is susceptible of numerous physical embodiments, depending upon the environment and requirements of use, a substantial number of the herein shown and described embodiment have been made, tested and used, and all have performed in an eminently satisfactory manner.

Before entering into detailed discussion of the present invention, a brief reference will be made to a prior art knife edge type focus detection method over which the present invention constitutes an improvement.

Figure 1:
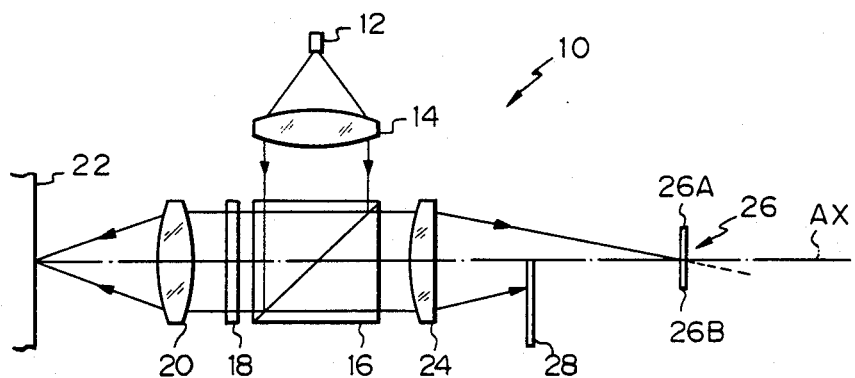
FIGS. 1–6 are diagrams representing a prior art knife edge type method for focus detection.

Referring to FIG. 1 of the drawings, optics associated with an optical pickup and employing the knife edge type focus detection method is shown in a fragmentary schematic view. The optics, generally 10, includes a semiconductor laser 12 serving as a light source, a coupling lens 14, a polarizing beam splitter 16, a ¼ wavelength plate 18, and an object lens 20. An information recording medium 22 is located adjacent to the object lens 20. The optics 10 further includes a converging lens system 24, a light receiving element 26 for focus detection, and a flat light intercepting member or plate 28.

Light issuing from the laser 12 is transformed into a parallel beam by the coupling lens 14. The parallel beam is incident on the polarizing beam splitter 16 to be reflected to the left in the drawing. The light reflected by the beam splitter 16 is sequentially transmitted through the ¼ wavelength plate 18 and object lens 20 to be thereby focused to the recording medium 22. Generally, the recording medium 22 is in the form of a disc and, for the concreteness and simplicity of description, it will be referred to as the "disc 22" hereinafter.

The light incident on the disc 22 is reflected therefrom to become incident on the object lens 20 from the left in the drawing. The light is transmitted through the object lens 20 and then the ¼ wavelength plate 18 to impinge on the beam splitter 16. Because the light so incident on the beam splitter 16 has passed through the ¼ wavelength plate 18 two times, its plane of polarization has been rotated 90 degrees from the initial position. Therefore, the light advances straight through the beam splitter 16 this time, reaching the converging lens system 24. The lens system 24 focusses the incoming light to the light receiving element 26. The optical axis of the lens system 24 is aligned with the optical axis of the object lens 20, designated by AX in FIG. 1.

Figure 2:
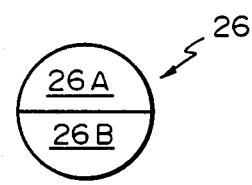

As shown in FIG. 2, the light receiving element 26 has a bisected light receiving surface made up of two sections 26A and 26B. The position of the element 26 is such that the line separating the two sections 26A and 26B extends perpendicular to the sheet surface of FIG. 1 and the light receiving surface, perpendicular to the optical axis AX.

Figure 3:
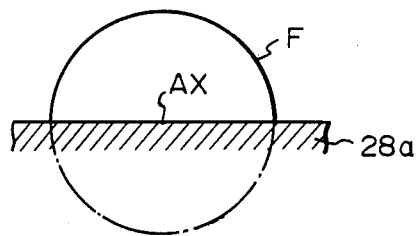

The light interceptor 28 has a linear edge or knife edge and is interposed between the lens system 24 and the light receiving element 26 to extend perpendicular to the sheet surface of FIG. 1. As shown in FIG. 3, the light interceptor 28 intercepts 50% of the light flux F converge by the lens system 24 from the element 26.

Figure 4:
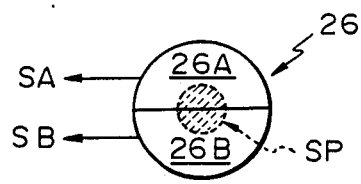

In the situation shown in FIG. 1, the laser beam is assumed to have been focused properly to the disc 22 by the object lens 20. The flux turns into a parallel flux when transmitted through the object lens 22 after being reflected by the disc 22. Transmitted through the lens system 24, the parallel flux converges to a position which coincides with the focus of the lens system 24. Experiments showed that the converged flux, despite the presence of the light interceptor 28, focuses itself to the position of the focus of the lens system 24, forming a spot whose diameter is about 100 μm. This is schematically shown in FIG. 4, in which the beam spot is designated by SP.

Under the condition described above, signals SA and SB are picked up by photoelectric conversion from the two adjacent sections 26A and 26B of the light receiving element 26, thereby preparing a focus signal SA-SB. The position of the light receiving element 26 is so adjusted relative to the spot SP (FIG. 3) as to make the focus signal zero. In detail, if the laser beam is properly focused to the disc 22, the focus signal will be zero and the two sections 26A and 26B of the element 26 will be receiving an equal quantity of light.

Figure 5:
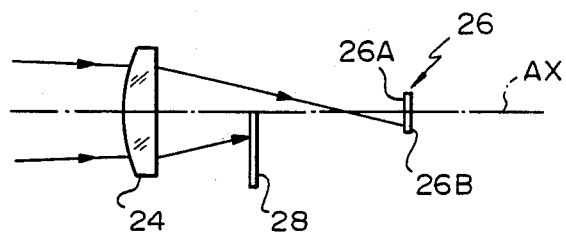

When the disc 22 is dislocated from the focus of the object lens 20 in the direction away from the lens 22, the light reflected by the disc 22 will turn itself into a converging flux when transmitted through the lens 22. Therefore, when additionally converged by the lens system 24, the light flux will become mislocated toward the lens system 24, as shown in FIG. 5. As a result, the section 26B receives a larger quantity of light than the section 26A to make the focus signal SA-SB smaller than zero.

Figure 6:
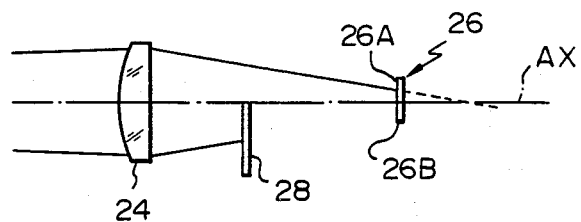

Conversely, when the disc 22 is dislocated from the predetermined position toward the object lens 20, the light reflected from the disc 22 appears as a divergent flux when transmitted through the object lens 20. This causes the lens system 24 to focus the light to a position on the right-hand side of the element 26 as viewed in FIG. 6, so that the section 26A receives a larger quantity of light than the section 26B making the focus signal SA-SB larger than zero.

In this manner, the laser beam can be adequately focused to the disc 22 by displacing the whole optics or only the object lens 20 along the optical axis of the lens 20 until the focus signal becomes reduced to zero.

Figure 7:
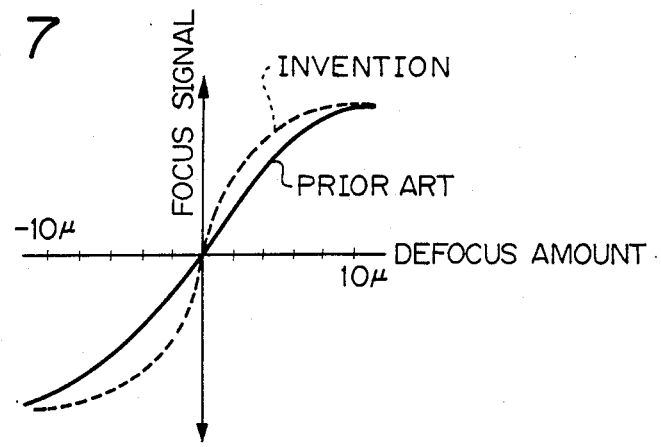
FIG. 7 is a plot demonstrating an advantage attainable with a focus detection method of the present invention.

The prior art knife edge type focus detection described above, however, is not always satisfactory in the sensitivity of detection as previously discussed. The limited sensitivity will be understood from a solid line in FIG. 7 showing a relationship between a focus signal and a defocus amount.

The reason why the prior art focus detection method of the type concerned is poor in sensitivity will be described first. In FIG. 1, assume a light flux which has been transmitted through the object lens 20. This flux is one which will be allowed for focus detection and, therefore, it will be referred to as the "reflected flux for focus detection" for simplicity. The flux F shown in FIG. 3 represent the reflected flux for focus detection. Although named "reflected flux for focus detection", this flux should be understood as not implying that it is unusable for other applications such as reading information, tracking, etc.

Now, as shown in FIG. 3, the reflected flux for focus detection is cut by 50% by the light interceptor 28 before reaching the light receiving element 26. Under the focused condition, light is incident not only on the section 26A but on the section 26B of the element 26, presumably by diffraction (see FIG. 4). It will be understood from FIGS. 1 and 3 that the diffraction is greatly effected by the light rays adjacent to a light ray on the optical axis AX in the reflected flux for focus detection. Meanwhile, the reflected flux for focus detection has an intensity peak at a position adjacent to the optical axis AX.

For the above reason, the specific light ray in the reflected flux for focus detection which propagates through the optical axis of the lens 20 will be called the "axis ray". Rays in the neighborhood of the axis ray have a high intensity so that they are allowed to reach the adjacent sections of the light receiving element 26 by diffraction. Additionally, the incident condition of the rays adjacent to the axis ray on the element 26 little differs from the focused to the non-focused state. A substantial change in the focus signal SA-SB is brought about by light components which are remote from the axis ray and generally low in intensity. These will account for the problem of low sensitivity particular to the prior art knife edge type focus detection method.

As described above, the limited detection sensitivity of the prior art method for focus detection stems from the presence of light rays in the reflected flux for focus detection which neighbor the optical axis.

Figure 8:
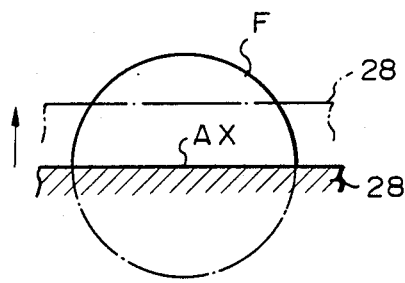
FIGS. 8 and 9 are diagrams explanatory of an example of the method of the present invention.
Figure 9:
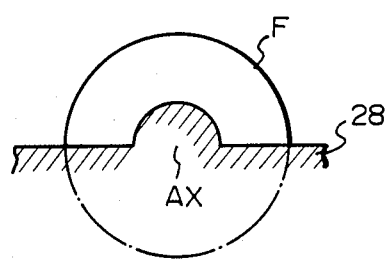

We varied the proportion of the reflected flux F for focus detection cut by the light interceptor 28 in the manner shown in FIG. 8, checking the resulting detection sensitivity. The interceptor 28 passes a minor segment of a circular cross-sectional area of the converged flux defined by the edge of the interceptor 28 which constitutes a chord of the circle and the arc of the circle above said edge as viewed in FIG. 8. The experiment showed that the sensitivity can be effectively improved when 60-95% of the flux, inclusive of the axis ray, is cut by the light interceptor, and remarkably increased when the interception ratio is 70-85%. The dotted focus-defocus curve shown in FIG. 7 represents a sensitivity provided by the interception ratio of 75%. As previously mentioned, what lowers the sensitivity is the light rays adjacent to the optical axis. In accordance with the present invention, therefore, use may be made of a light interceptor 28a shown in FIG. 9 which includes a semicircular projection for intercepting the axis ray and rays adjacent thereto.

In summary, it will be seen that the present invention provides a knife edge type method for focus detection which features an unprecedented sensitivity of detection.

Figure 10:
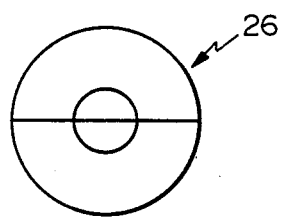
FIG. 10 is a plan view of an example of a light receiving element for focus detection applicable to the method of the present invention.

The light receiving element may be furnished with a function other than the focus detecting function, e.g. the function of reading RF signals. The bisected configuration of the light receiving element is merely illustrative and may be replaced by, for example, the quadrisected configuration 26a shown in FIG. 10.

While the light interceptor serves to intercept part of the reflected flux for focus detection from the light receiving element, it may comprise a mirror so that the intercepted part of the light is reflected toward another light receiving element for tracking purpose, for example. The light interceptor needs only be located in a suitable position between the object lens and the light receiving element for focus detection.

Furthermore, the converging lens system may comprise the combination of a concave lens and a convex lens, or even the object lens per se may be constructed as a converging lens system.

Various modifications will become possible for those skilled in the art after receiving the teachings of the present disclosure without departing from the scope thereof.

What is claimed is:

1. A method of detecting a focus of optics associated with an optical pickup, comprising the steps of:
    (a) turning light issuing from a laser into a parallel flux;
    (b) splitting the parallel flux by means of a polarizing beam splitter;
    (c) converting the flux split by polarization to an information recording medium through a ¼ wavelength plate and an object lens;
    (d) transmitting light reflected by the recording medium through the object lens and the ¼ wavelength plate along an optical axis so as to form a parallel flux;
    (e) converging the parallel reflected flux by a converging lens;
    (f) cutting 60–95% of the converged reflected flux by means of a light intercepting plate which intercepts a central part of the converged reflected flux surrounding the optical axis and passes at least a peripheral part of a minor segment of a circular cross-sectional area of the converged reflected flux;
    (g) causing the passed part of the reflected flux to converge to a light receiving element to form a light receiving surface in a spot having a predetermined area; and
    (h) dividing the area of the light receiving spot into at least two sections and performing a control such that the adjacent sections of the light receiving spot receive a same quantity of light.

2. The method as claimed in claim 1, in which step (f) comprises the step of (i) moving the light intercepting plate perpendicular to the optical axis.

3. The method as claimed in claim 1, in which step (f) comprises providing the light intercepting plate having a linear knife edge.

4. The method as claimed in claim 1, in which step (f) comprises providing the light intercepting plate having a mirror for reflecting the intercepted part of the flux.

5. The method as claimed in claim 1, further comprising, between the steps (d) and (e), the step (j) aligning an optical axis of the object lens and an optical axis of the converging lens to each other.

6. The method as claimed in claim 1, further comprising, between the steps (f) and (g), the step of (k) causing a focus of the converging lens to coincide with the light receiving surface of the light receiving element.

7. The method as claimed in claim 1, in which step (h) comprises the step of (l) controlling an optical position of the light receiving element.

8. The method as claimed in claim 1, in which step (h) comprises the step of (m) controlling an optical position of the object lens.

9. The method as claimed in claim 1, in which step (h) comprises the step of (n) controlling an optical position of the whole optics.

* * * * *